US005962561A

United States Patent [19]

Turshani et al.

[11] Patent Number: 5,962,561

[45] Date of Patent: Oct. 5, 1999

[54] INTERNAL MOLD RELEASE COMPOSITIONS CONTAINING PHOSPHATE ESTERS

[75] Inventors: Yassin Yusef Turshani; Richard William Neuzil, Jr., both of Largo; Joseph Boryslawski, St. Petersburg, all of Fla.

[73] Assignee: Essilor International (Compagnie Generale d'Optique), Charenton-le-Pont, France

[21] Appl. No.: 09/207,040

[22] Filed: Dec. 8, 1998

Related U.S. Application Data

[63] Continuation of application No. 08/682,078, Jul. 17, 1996, abandoned.

[51] Int. Cl.[6] .............................. C08J 3/00; C08K 3/20; C08L 75/00; C08G 18/08

[52] U.S. Cl. .......................... 524/140; 524/145; 524/590; 528/51

[58] Field of Search .................................... 524/140, 145, 524/590; 528/51

[56] References Cited

U.S. PATENT DOCUMENTS

| | | | |
|---|---|---|---|
| 4,258,169 | 3/1981 | Prather et al. | 528/72 |
| 4,571,365 | 2/1986 | Ashlock et al. | 428/412 |
| 4,622,376 | 11/1986 | Misura et al. | 526/286 |
| 4,689,387 | 8/1987 | Kajimoto et al. | 528/76 |
| 4,780,522 | 10/1988 | Kajimoto et al. | 528/76 |
| 4,929,707 | 5/1990 | Nagata et al. | 528/76 |
| 4,946,923 | 8/1990 | Nagata et al. | 528/76 |
| 4,975,328 | 12/1990 | Hirose et al. | 428/413 |
| 5,013,496 | 5/1991 | Nagata et al. | 264/2.3 |
| 5,231,195 | 7/1993 | Prabhu et al. | 549/308 |

FOREIGN PATENT DOCUMENTS

| | | |
|---|---|---|
| 0 271 839 | 6/1988 | European Pat. Off. . |
| 329 388 | 8/1989 | European Pat. Off. . |
| 330 363 | 8/1989 | European Pat. Off. . |
| 676 429 | 6/1996 | European Pat. Off. . |
| 61-54331 | 11/1986 | Japan . |
| 62-92685 | 4/1987 | Japan . |
| 63-280701 | 11/1988 | Japan . |

*Primary Examiner*—Patrick D. Niland
*Attorney, Agent, or Firm*—Foley & Lardner

[57] ABSTRACT

Internal mold release compositions for molding polyurethane and polythiourethane is disclosed herein. The composition includes a mixture of: (a) a mono $C_2$–$C_6$ alkyl phosphate; (b) a di $C_2$–$C_6$ alkyl phosphate, wherein the alkyl groups of the di-alkyl phosphate may be the same or different, and wherein the alkyl groups of the mono- and di-alkyl phosphate may be the same or different; and (c) a $C_7$–$C_{18}$ mono- and/or di-alkyl phosphate. Also disclosed is a polymerizable composition which includes (a) one or more monomers containing two or more isocyanate groups; (b) one or more monomers containing two or more functional groups selected from a thiol group and a hydroxyl group; (c) a mixture of a mono- $C_2$–$C_6$ alkyl phosphate and a di- $C_2$–$C_6$ alkyl phosphate, wherein the alkyl groups of the di-alkyl phosphate may be the same or different and wherein the alkyl groups of the mono- and di-alkyl phosphate mixture may be the same or different, wherein the mono- $C_2$–$C_6$ alkyl phosphate is present in an amount of $\geqq 20$ wt %, based on the total weight of the mixture of the mono- $C_2$–$C_6$ alkyl phosphate and the di- $C_2$–$C_6$ alkyl phosphate. The composition can also optionally include the $C_7$–$C_{18}$ mono- and/or di-alkyl phosphate.

12 Claims, No Drawings

INTERNAL MOLD RELEASE COMPOSITIONS CONTAINING PHOSPHATE ESTERS

This application is a continuation of application Ser. No. 08/682,078, filed Jul. 17, 1996 now abandoned.

BACKGROUND OF THE INVENTION

1. Field of the Invention

The present invention relates to internal release compositions as additives to synthetic resin mixtures for use in the production plastic products, such as of plastic lenses. More specifically, the present invention relates to a composition of phosphoric acid esters for the production of polyurethane or polythiocarbamate lenses for eye glasses.

2. Description of the Known Art

Lenses for eye glasses fabricated from plastic resinous substances are known in the art. Traditionally, the lenses are made from diethylene glycol bis(allyl carbonate), which is known commercially in its monomeric or polymerized form as CR-39. According to known manufacturing processes, the CR-39 monomer is mixed with free radical initiator, such as diisopropyl peroxy dicarbonate. This mixture is injected within a pair of glass mold sections that are sealed by a gasket and held together by a spring clip or other suitable fastener. The filled mold assembly is then heated in a water bath or oven to a predetermined temperature to cure the resin.

The wide acceptance of CR-39 is due to its clarity, tintability, high scratch and impact resistance, high resistance to discoloration and resistance to warping or distortion. However, CR-39 has a major drawback. The plastic lenses made from CR-39 have a refractive index (nd) of about 1.50, which is lower than the refractive index of conventional glass lenses, the latter being about 1.52. The thickness of the lenses must therefore, be larger than the thickness of conventional glass lenses.

Efforts have been made to develop synthetic materials which are capable of producing higher refractive index lenses than those currently produced by CR-39. Polythiocarbamate (hereinafter polythiourethane) resins have been known as one of the best lens resins capable of achieving high refractive index, generally about 1.6, with outstanding optical and physical lens properties. A more complete description of this type of material can be found in U.S. Pat. No. 4,689,387 and U.S. Pat. No. 4,780,522.

While casting to form a plastic lens is well known, the process for industrial production of plastic lenses, especially polyurethane, has been extremely difficult. One major drawback of molding polyurethane or polythiourethane is the tendency of these polymers to adhere to glass molds, making mold disassembly very difficult if not impossible. The adherence of the lens to the inner surface of the mold during casting was found to depend on many processing parameters or variables, such as the type of glass used to make the mold, cleanliness of the mold, age of the mold, shape and curvature of the mold, composition of the lens forming material, length and temperature of the curing cycle, and the elasticity of the gasket material used in the mold assembly. To obtain high yields and thus make industrial production possible, the adherence of the mold must be sufficient to firmly hold the plastic lens against the mold surface through the curing stage, yet sufficiently weak to allow cohesive separation following cure. Premature release before curing is completed, usually results in a defective lens surface. This phenomenon is known as the demolding defect. Conversely, too much adherence between the lens and mold after curing will result in difficult disassembly and/or mold damage. This defect is known as poor mold release.

Experience has shown that in spite of the close control of many known variables, the industrial production of polyurethane and polythiourethane plastic lenses has been very costly because of inconsistent mold release. One known method attempted to solve this problem by coating the inner surface of the mold with surface lubricants, such as siloxanes and fluorinated hydrocarbons. These are known as external mold release agents. However, the process of applying mold surface lubricants has several drawbacks including part or all of the mold release film transferring to the lens surface. This in turn may create areas of inconsistent physical properties across the lens surface, which can adversely affect the adhesion performance, and tinting of coatings applied to the lens.

Additional disadvantages of using external mold release compositions include the technical difficulties associated with this process:

1) The mold release is generally applied by dipping molds into a release solution bath. In the past, release baths could employ fluoro-chloro hydrocarbons, e.g., Freon, as the solvent. Recently, an EPA ban on such solvents dictates the use of environmentally friendly solvents, such as aqueous based systems. The aqueous systems are highly pH dependent. Changes in pH can cause agglomeration of release particles in the bath—consequently staining the mold, and/or compromising integrity of the release system. The result is at best a stained lens, at worst, a loss of molds, or both.

2) The mold release may be applied manually—by hand—similar to waxing automobile paint. Wiping the release onto the mold surface results in extra handling, and increased possibility of mold damage and/or staining.

Although integrity of the release itself is generally reliable, the process is extremely labor intensive.

Instead of coating the mold with mold release system, it has been proposed to add a releasing agent to the lens forming material and then subject the whole mixture to cast polymerization. These release systems are known as internal release agents. The known art discloses the use of silicones, fluorinated hydrocarbons, fatty acids, and ammonium salts as internal release agents in lens casting processes, see U.S. Pat. Nos.: 4,622,376 and 4,929,707 and EP 271 839. These types of internal release materials, when used in the casting process of polyurethane or polythiourethane, often fail because of poor and inconsistent releasing or due to compatibility problem, such as solubility problem or adversely affecting the physical properties of the cast lens such as optical clarity, rigidity and hardness.

U.S. Pat. No. 4,662,376 discloses that a mixture of mono and dialkyl phosphates of long straight chain alkyl groups of from 8 to 16 carbon atoms, commercially available under the trademarks Ortholeum™ and Zelec™UN (available from DuPont, Inc., Wilmington, Del.), are suitable internal release agents for cast polymerization of acrylates and allylic carbonates in a preferred amount of 25 to about 100 ppm of the total weight of lens forming material. (U.S. Pat. No. 4,662,376 refers to the Zelec™UN as having 16 to 18 carbon atoms in the alkyl group(s), however, according to the MSDS from DuPont, Zelec™UN has 8 to 16 carbon atoms in the carbon chain). Casting polyurethane or polythiourethane lenses, on the other hand, requires much larger amounts of these internal release agents, about 2000 ppm, to induce consistent releasability of the polyurethane or polythiourethane lens from the mold. However, the use of amounts of 1000 ppm or more of these long chain alkyl phosphate release agents forms hazy lenses. Therefore, using these release agents alone is unsuitable for casting polyurethane and polythiourethane lens materials.

EP 271 839 describes, inter alia, the use of acidic mono or diphosphate esters including dibutyl phosphate as internal releasing agents in polyurethane compositions for lenses. U.S. Pat. No. 4,975,328 describes the use of short chain dialkyl phosphoric acid esters, such as dibutyl phosphate, as an internal release for casting polythiourethane lenses. In this patent, the use of short chain dialkyl phosphoric acid esters is described at rather high concentrations (up to 20%) and most of the examples describe the use of dibutyl phosphate at 2.5%, i.e., 25,000 parts per million. This higher concentration is due to the fact that dibutyl phosphate alone is not a very efficient releasing agent.

However, high amounts of internal release is undesirable because of the negative effect on the lens mechanical properties. Polythiourethane lenses, in general have poor high temperature performance, such as for example, lenses tending to distort during tinting. In addition, polythiourethane lenses produce strong sulfur odors during lens processing [surfacing and edging]. These two inherent defects worsen and become unacceptable as the lens becomes softer due to the addition of higher amounts of internal release agent. Therefore, dibutyl phosphate alone appears to be unacceptable as an internal release agent for manufacturing polythiourethane lenses for eye glasses.

Accordingly, the need still exists for good consistent mold releasability in the industrial manufacturing of polyurethane and polythiourethane lenses. Therefore, the present inventors have conducted intensive research to develop an efficient internal release system to overcome the problems and disadvantages inherent in the prior art.

SUMMARY OF THE INVENTION

One object of the present invention is to overcome the disadvantages of the known art described above. Another object of the invention is to provide an efficient and consistent mold releasability for manufacturing polyurethane and polythiourethane lenses for eye glasses.

Still another object of the invention is to provide consistent mold releasability without the need for an external mold release.

It is still another object of this invention to provide an efficient and consistent mold releasability without pre-releasing defect or mold damage and without adversely affecting the physical properties of the lens, such as its optical clarity, refractive index, rigidity, hardness, impact resistance, scratch resistance, tintability, surfaceability, and edging.

Another object of the present invention is to provide an improved mold release composition. Yet another object of the invention is to provide a polymerizable composition and polymer containing the mold release composition of the present invention. Still another object of the present invention is to provide a process for the production of a plastic, such as a plastic lens, which uses the mold release composition.

The foregoing and further objects of the invention are achieved according to one aspect of the present invention which provides a mold release composition comprising: (a) a mono $C_2$–$C_6$ alkyl phosphate; (b) a di $C_2$–$C_6$ alkyl phosphate, wherein the alkyl groups of the di-alkyl phosphate may be the same or different, and wherein the alkyl groups of the mono- and di-alkyl phosphate may be the same or different; and (c) a $C_7$–$C_{18}$, mono- and/or di-alkyl phosphate, wherein the alkyl groups of the $C_7$–$C_{18}$ di-alkyl phosphate may be the same or different, and wherein the alkyl groups of the $C_7$–$C_{18}$ mono- and di- alkyl phosphate may be the same or different.

According to another aspect of the present invention there has been provided a polymerizable composition comprising: (a) one or more monomers containing two or more isocyanate groups; (b) one or more monomers containing two or more functional groups selected from a thiol group and a hydroxyl group; (c) a mixture of a mono- $C_2$–$C_6$ alkyl phosphate and a di- $C_2$–$C_6$ alkyl phosphate, wherein the alkyl groups of the di-alkyl phosphate may be the same or different and wherein the alkyl groups of the mono- and di-alkyl phosphate mixture may be the same or different, and wherein the mono- $C_2$–$C_6$ alkyl phosphate is present in an amount of ≧20 wt%, based on the total weight of the mixture of the mono- $C_2$–$C_6$ alkyl phosphate and the di- $C_2$–$C_6$ alkyl phosphate. In a preferred embodiment, at least one of the two or more functional groups is a thiol group. In another preferred embodiment, the polymerizable composition further includes a (d) a $C_7$–$C_{,18}$ mono- and/or di-alkyl phosphate, wherein the alkyl groups of the $C_7$–$C_{18}$ , di-alkyl phosphate may be the same or different, and wherein the alkyl groups of the $C_7$–$C_{18}$ mono- and di- alkyl phosphate may be the same or different.

According to another aspect of the present invention there has been provided a process for producing a polymer, and a polymer produced therefrom, comprising: (a) providing a composition comprising: (i) one or more monomers containing two or more isocyanate groups, (ii) one or more monomers containing two or more functional groups selected from a thiol group and a hydroxyl group, (iii) a mixture of a mono- $C_2$–$C_6$ alkyl phosphate and a di- $C_2$–$C_6$ alkyl phosphate, wherein the alkyl groups of the di- $C_2$–$C_6$alkyl phosphate mixture may be the same or different, and wherein the alkyl groups of the mono- and di-alkyl phosphate may be the same or different, and wherein the mono- $C_2$–$C_6$ alkyl phosphate is present in an amount of ≧20 wt%, based on the total weight of the mixture of the mono- $C_2$–$C_6$ alkyl phosphate and the di- $C_2$–$C_6$ alkyl phosphate, and (iv) a catalyst; and (b) subjecting the composition to a polymerization reaction. In a preferred embodiment at least one of the two or more functional groups is a thiol group. In another preferred embodiment, the composition further includes a (d) a $C_7$–$C_{18}$ mono- and/or di-alkyl phosphate, wherein the alkyl groups of the $C_7$–$C_{18}$ di-alkyl phosphate may be the same or different, and wherein the alkyl groups of the $C_7$–$C_{18}$, mono- and di- alkyl phosphate may be the same or different.

According to still another aspect of the present invention there has been provided a process for producing a plastic lens and a plastic lens produced therefrom, which includes the process according to the present invention with the step of pouring the composition into a lens mold prior to completion of polymerization, to produce a plastic lens.

Further objects, features and advantages of the invention will become apparent to those skilled in the art from consideration of the detailed description of preferred embodiments which follows.

DETAILED DESCRIPTION OF THE PREFERRED EMBODIMENTS

The present invention involves the use of a mixture of phosphoric acid esters as an efficient internal release agent for industrial production of polyurethane and polythiourethane resins, such as plastic lenses for eyeglasses. Although much of the following description of the preferred embodiments is directed to lenses, it should be understood that uses of the polyurethane and polythiourethane resins containing the mold release compositions in applications other than lenses is fully contemplated by the present invention, such as use in the automotive industry.

In the present invention, one or more NCO containing compounds is blended with one or more SH and/or OH containing aliphatic or aromatic compounds, catalyst, and the release system. The components are mixed, generally under vacuum and chilled, then poured between two glass molds. The filled mold is then allowed to thermally cure in a vat and/or oven for 10 to 72 hours.

The internal release agent or composition of the present invention is a blend of mono- and/or di-substituted short chain, C2 –C6 alkyl phosphate and mono- and di- substituted long chain, C7 –C18 alkyl phosphate esters. In the case of dialkyl phosphates (regardless of chain length) there is one P—OH group in the dialkyl phosphate molecule. In the case of monoalkyl phosphates there are two P—OH groups in the monoalkyl phosphate molecule.

The alkyl groups of the short chain di-alkyl phosphate may be the same or different and the alkyl groups of the mono- and di-alkyl phosphate may be the same or different. Illustrative alkyl groups and combinations of alkyl groups include, but are not limited, to mono or diethyl, mono or di propyl, mono or di butyl, mono or di pentyl mono or di hexyl phosphates. Also, ethyl propyl, ethyl butyl, ethyl pentyl, ethyl hexyl, propyl butyl, propyl pentyl, propyl hexyl, and other di substituted phosphates can also be used. Any combination of these short chain esters may generally be used. In those embodiments where only short chain alkyl phosphates are used, the mono- C2–C6 alkyl phosphate is generally present in an amount of ≧20 wt %. In most embodiments, the ratios are preferably in the range of 20 wt % to 60 wt % monosubstituted, 40 wt % to 80 wt % disubstituted.

The short chain alkyl phosphate esters are preferably mono or di propyl, mono or di butyl, mono or di pentyl, in mixtures of 30 wt % to 50 wt % monosubstituted and 50 wt % to 70 wt % disubstituted phosphates.

Most preferably, the short chain alkyl phosphate mixture is a 45% mono substituted and 55% disubstituted butyl phosphate ester. Monobutyl acid phosphate and dibutyl acid phosphate in a 45:55 wt/wt ratio is commercially available from Kodak and Johoko Chemical companies. Hereinafter, this particular phosphate mixture will be referred to as the MBP/DBP mixture.

The advantage of using short chain mono- and di-alkyl phosphates in combination according to the present invention compared to the separate use of each of these phosphates is demonstrated in Comparatives Examples 9 and 10.

According to another aspect of the present invention, the inclusion of longer chain alkyl phosphates in the monomer was found to greatly improve the mold release and other characteristics. Specifically, the efficiency of the short chain mono and di- alkyl phosphates system can be improved further by adding a $C_7$–$C_{18}$ mono and/or di-alkyl phosphate.

The alkyl groups of the $C_7$–$C_{18}$ di-alkyl phosphate may be the same or different, and the alkyl groups of the $C_7$–$C_{18}$ mono- and di- alkyl phosphate may be the same or different. Illustrative alkyl groups and combinations of alkyl groups include, but are not limited to, mono- and/or di-heptyl, mono- and/or di-octyl, mono- and/or di-nonyl, mono- and/or di-decyl, mono- and/or di-undecyl, mono- and/or di-dodecyl, mono- and/or di-tetradecyl, mono- and/or di-hexadecyl, mono- and/or di-octadecyl phosphates. Also included are heptyl octyl, heptyl nonyl, heptyl decyl, octyl nonylphosphates, and so on.

The long chain phosphate esters are preferably the mono- and/or di-, C7 to C 18, alkyl phosphate and most preferably the mono- and/or di-, C8 to C16 alkyl phosphate commercially available from DuPont Chemical, known as Zelec™ UN.

The presence of 600 ppm Zelec™ UN in addition to the short chain alkyl phosphate esters can reduce the total release requirement by nearly 50% to 60% of the total release requirement compared to short chain phosphates used alone (see Example 7).

For all the examples, straight short chain (C2 to C6) and straight long chain (C7 to C18) alkyl phosphates were used. However, it is believed that branched chain alkyl phosphates would work satisfactorily.

The amount of the phosphate ester composition to use will vary broadly depending on the desired properties of the polyurethane and polythiourethane product. One skilled in the art using the present specification as a guide, will be able to determine appropriate amounts to be used for a particular application.

For the production of lenses, the amount and type of alkyl phosphates of the present invention, are selected by taking into consideration the releasability performance of the polyurethane or polythiourethane lens from the mold and the physical and optical properties of the lens. The lens should consistently release from the mold without damaging the lens or the mold with production yields of 90% or better. The internal release should not adversely affect the optical clarity, refractive index, rigidity, hardness, impact resistance, scratch resistance, tintability, surfaceability, or edging. Exact amounts and types of alkyl phosphates to be used can be determined by those skilled in the art using the present specification as a guide. In general, the C2 to C6 phosphate esters may be present at concentrations ranging from 1000 ppm to 15000 ppm by weight, based on the total weight of the monomer system, with C7 to C18 phosphate esters between 400 ppm and 1600 ppm by weight. Preferably, based on the total weight of the monomer system, the C2 to C6 phosphate esters may be present at concentrations ranging from 1000 ppm to 7000 ppm by weight, with C7 to C18 phosphate esters between 400 ppm and 800 ppm by weight. Most preferably, based on the total weight of the monomer system, the C2 to C6 phosphate esters may be present at concentrations of 1500 ppm to 3000 ppm by weight, with C7 to C18 phosphate esters at 500 ppm to 700 ppm by weight.

The ratio of the short chain to long chain alkyl phosphate esters are preferably in a range from 1.5:1 to 8:1, more preferably from 2.5:1 to 4.0:1. While ratios outside these preferred ranges are not outside the scope of the invention, for some applications such as high quality lenses, the release qualities may not be as advantageous as those preferred ratios set forth above.

The tri-substituted alkyl phosphates have no active hydroxy group to react with the NCO functional groups, and are unable to form a bond and be incorporated into the polymer network. Generally, no release from the mold is gained using tri-substituted phosphates, and while not excluded from the scope of the present invention, no advantage is gained by the use therein.

The NCO containing compounds may be comprised of, but are not limited to, isophorone diisocyanate, hexamethylene diisocyanate, any isomer of toluene diisocyanate, any isomer of xylene diisocyanate, isocyanatoethyl 2,6-diisocyanotohexanoate, 4,4'-diphenylmethane diisocyanate, any isomer of tetrachloro toluene diisocyanate or tetrachloro xylene diisocyanate.

The preferred NCO containing components are the aromatic diisocyanates such as m-xylene diisocyanate, p-xylene diisocyanate, p-toluene diisocyanate, or m-toluene diisocyanate. The most preferred of these is m-xylene diisocyanate.

The SH/OH containing aliphatic or aromatic compounds must contain two or more SH groups, two or more OH groups, or one or more OH groups in combination with one or more SH groups. These compounds include, but are not limited to: di(2-mercaptoethyl) ether, 1,2-ethanediol, 1,4-butanedithiol, trimethylolpropane tris (thioglycolate), glycerol, thioglycerol, pentaerythritol tetrakis (beta-mercapto propropionate), pentaerythritol tris-(beta-mercaptopropropionate), pentaerythritol-tetrakis-(thioglycolate), 1,2,3-trimercaptobenzene, and 4-methyl-1,2-dimercaptobenzene.

Of these, the preferred compounds are pentaerythritol-tetrakis-(beta-mercaptopropropionate), pentaerythritol-tris-(beta-mercaptopropropionate), and thiogycerol. The most preferred compound is pentaerythritol-tetrakis-(beta-mercaptopropropionate).

The NCO containing compounds and SH/OH containing compounds are generally blended so that the ratio of NCO to SH+OH groups is generally 0.5 to 3.0, preferably 0.75 to 1.5, and most preferably 1 to 1. The effect of the ratio being less than 0.5 is a soft, rubbery material. The cured polymer may not release well from any curing molds, and may emit foul odors when machined. If the ratio is greater than 3.0, the material may be yellow, brittle, and contain optical distortions.

The monomer blend is catalyzed with any standard urethane or thiourethane catalyst, such as di butyl tin dilaurate, dibutyl tin dichloride, generally in the range of 20 to 2000 ppm. The preferable concentration range is 30 to 250 ppm, and most preferable 40 to 125 ppm.

Excess catalyst in the monomer may cause, in mild cases, optical distortion in the resulting lenses, in severe cases, premature gelling and hazardous polymerization. Too little catalyst will result in insufficient curing of the polymer.

Standard UV absorbers may be added to the monomer blend as well. UV absorbers such as Cyasorb UV 5411 (a benzotriazole derivative), Cyasorb UV 9 and UV 24 (both benzophenone derivatives), and Cyasorb UV 3638 (a benzotriazole derivative) available from Cytec Industries, Inc., may all be used. The range may be between 100 and 5000 ppm, preferably 1000 to 5000 ppm, and most preferably 2500 to 5000 ppm.

Excess addition of the UV absorber will result in yellow lenses. Too little UV absorber may cause faster aging of the lens material.

The invention is now described with reference to the following examples which are not intended to limit the scope of the present invention.

Process for Monomer Preparation

In the following examples, the monomer blends were prepared as follows:

1. A mixing vessel is charged with a poly(thi)ol flowing into the reactor under vacuum. The contents of the reactor are maintained between −10° C. and 20° C. during batch preparation and mold filling. Preferably the temperature is between 0C. to 20° C., and most preferably between 50C. to 15° C.

2. The total quantity of diisocyanate required is calculated. It is the total amount required to adjust the mole ratio of NCO to OH+SH groups.

3. Between 70% and 80% of required diisocyanate is added to the reactor. The remaining diisocyanate is used to pre mix the release agent, optional UV absorber, and catalyst into the vessel.

4. Formulations without UV absorber: Approximately 15% to 30% of diisocyanate is required for each of two additive pre mixes. The diisocyanate used in each additive premixes is: (Total quantity of diisocyanate needed for monomer batch minus amount diisocyanate added in Step 3)/2.

If an optional UV absorber is added, a separate additive premix is used for this addition. In this case, approximately 5% to 10% of diisocyanate is required for each of three additive pre-mixes. The diisocyanate used in each additive premix is: (Total quantity of diisocyanate needed for monomer batch minus amount diisocyanate added in Step 3)/3.

Additive pre mix #1:

5. The quantity of diisocyanate calculated in Step 4 is placed in a suitable flask with gentle agitation under dry nitrogen purge. A quantity of 45–55 wt % mono to di butyl phosphate mixture totaling 0.2% of the monomer batch weight is slowly added to the flask. The phosphate mixture must completely dissolve. At this time a quantity of C8–C18 mono- and di- alkyl phosphates totaling 600 ppm of the monomer batch size is slowly added. After this addition is completely dissolved, the contents of the flask are added to the reactor under vacuum. The phosphates described are preferably added separately in this order. Simultaneous addition or reversal of order of addition may result in cloudy lenses.

Additive pre mix #2 (UV absorber)

Using the same procedure above, a quantity of UV absorber based on monomer batch size is added to the flask, and subsequently, the reactor. To ensure clear, transparent lenses, the UV absorber is preferably added separately from the phosphates and the catalyst. Additive pre mix #2 (or #3 if UV absorber)

7. Using the same procedure as in step #5, a quantity of catalyst based on the monomer batch size is added to the flask, and subsequently, the reactor. The catalyst is preferably added separately from the phosphates and UV absorber, since it can induce the diisocyanate to react undesirably with either component.

8. The mixture is allowed to mix under vacuum in the reactor. Mixing time is generally 0.5 to 8 hours, preferably 0.5 to 4 hours, and most preferably 1 to 2 hours. The absolute pressure in the reactor is generally 1 to 100 torr, preferably 1 to 50 torr, and most preferably 1 to 10 torr.

9. After mixing is complete, the molds are filled from the monomer mixture in the reactor.

10. The molds are placed in different curing cycles of 10 to 100 hours in length. The initial starting temperatures are generally 0° C. to 30° C. and ramp to 100° C. to 135° C., then finally ramp to 50 to 75° C. before disassembly of molds.

EXAMPLES 1 to 3

Formulations with MBP/DBP only

Example 1

For Example 1, the polythiol was penta-erythritol-tetrakis-(3-mercaptopropionate) in an amount of 1000 grams.

The diisocyanate was m-xylene diisocyanate in a total quantity of 769.2 grams, 616.2 grams for the initial charge and 76.5 grams for each additive premix.

Other components: 14.26 grams of MBP/DBV, and an appropriate amount of catalyst.

When ready, the monomer mixture was poured into glass molds, and subjected to curing. The cure cycle used depends on the lens geometry cast. For thin lenses with a center thickness less than 3.0 mm, a 24 hour cycle starting between 25° C., and 50° C., heating to between 100° C. and 135° C., and cooling to between 50 and 75° C. was used. At between 50 and 75° C. the lenses were opened.

For thick lenses with a center thickness equal to or greater than 3.0 mm, a 48 hour cycle starting at 10° C., to 25° C., heating to between 100° C. and 135° C., and cooling to between 50 and 75° C. was used. At between 50° C. and 75° C. the lenses were opened.

In Example 1, the MBP/DBP level was 8000 ppm with no Zelec™UN. The thick lenses opened very easily, with some pre release marks, were clear, had good optical quality with a strong odor during machining.

Example 2

Example 2 represents a formulation of 7000ppm MBP/DBP, and no Zelec™UN. In this case, thick lenses only were cast. They opened well, were clear, good optical quality, and had a strong odor during machining.

Example 3

In Example 3, The MBP/DBP level was brought to 5000 ppm and, no Zelec™UN. The thick lenses were difficult to open with no damage. Lenses that did open were clear, with good optical quality. Odor tests were not performed.

EXAMPLES 4 THROUGH 8

Formulations with MBP/DBP and Zelec™UN

Example 4

To reduce odor upon lens generation, a lower level (4000 ppm) of MBP/DBP was tested. To ensure against mold damage, 1600 ppm of Zelec™UN was added. Thick lenses only were cast. The thick lenses opened very easily with some demolds, were clear and of good optical quality. A mild odor occurred during machining.

Example 5

The MBP/DBP level was reduced to 2000 ppm. The thick lenses were very easy to open with some demolds, were clear, had good optical quality, and had a mild odor during machining. Thin lenses very easy to open with some demolding.

Example 6

The MBP/DBP level was at 2000 ppm and the Zelec™UN was decreased to 850 ppm. The thin lenses were easy to open with no demolding, some pre-release marks, were clear, had good optical quality, and had a mild odor during machining.

Example 7

The MBP/DBP level was at 2000 ppm and the Zelec™UN was decreased to 600 ppm. Thin lenses easy to open with no demolding, had no pre release marks, were clear, had good optical quality, and had a mild odor during machining. This example represents the most preferred embodiment.

Example 8

The MBP/DBP level was at 3000 ppm and the Zelec@UN was at 600 ppm. The thin lenses were easy to open, had prerelease marks, were clear, had good optical quality, and had a mild odor during machining.

Comparative Example 1

No MBP/DBP was added and the Zelec™UN was present at 1000 ppm. The thin lenses were hard to open, had some mold damage and were hazy.

Comparative Example 2

Di ethyl phosphate was present at 2600 ppm. The thick lenses were easy to open, had no haze, but the lenses were yellow.

Comparative Examples 3, 4 and 5

Ethyl hexyl ethoxy carbonyl phosphate, tri butyl phosphate and tri ethyl phosphate were added respectively at 2700 ppm. In all cases, the thick lenses did not open, and the molds were lost.

Comparative Examples 6, 7 and 8

Tris(2 ethyl hexyl) phosphate, tri butyl phosphate and tri ethyl phosphate were added respectively at 7000 ppm. In all cases, the thick lenses did not open, and the molds were lost. Comparative Examples 6, 7, and 8 all represent the tri substituted phosphates. In all six cases, lenses did not release from the molds, at concentrations where MBP/DBP was successful. Di ethyl phosphate released successfully at lower concentrations.

Comparative Example 9

DBP at 7000 ppm. The thick lenses were difficult to open with some mold damage.

Comparative Example 10

Pure Monobutyl phosphate at 7000 ppm. The thick lenses were difficult to open with some mold damage and were hazy.

TABLE 1

Examples 1 through 8

| Example Number | ppm MBP/DBP | ppm Zelec | Disassembly | Odor | Optics | Hazy |
|---|---|---|---|---|---|---|
| 1 | 8000 | 0 | satisfactory | strong | good | no |
| 2 | 7000 | 0 | satisfactory | strong | good | no |
| 3 | 5000 | 0 | generally satisfactory | na | good | no |
| 4 | 4000 | 1600 | generally satisfactory | mild | good | no |
| 5 | 2000 | 1600 | generally satisfactory | mild | good | no |
| 6 | 2000 | 850 | satisfactory | mild | good | no |
| 7 | 2000 | 600 | satisfactory | mild | good | no |
| 8 | 3000 | 600 | satisfactory | mild | good | no |

TABLE 2

| Comparative Examples 1 through 10 | | | | | |
|---|---|---|---|---|---|
| Comparative Example Number | Release Agent | ppm by Weight | Disassembly | Optics | Hazy |
| 1 | Zelec | 1000 | unsatisfactory | na | yes |
| 2 | Diethyl Phosphate Ethyl Hexyl Ethoxy | 2600 | satisfactory | yellow lenses | no |
| 3 | Carbonyl Phosphate | 2700 | unsatisfactory | na | na |
| 4 | Tri Butyl Phosphate | 2700 | unsatisfactory | na | na |
| 5 | Tri Ethyl Phosphate | 2700 | unsatisfactory | na | na |
| 6 | Tris(2-Ethylhexyl phosphate) | 7000 | unsatisfactory | na | na |
| 7 | Tri Butyl Phosphate | 7000 | unsatisfactory | na | na |
| 8 | Tri Ethyl Phosphate | 7000 | unsatisfactory | na | na |
| 9 | Di Butyl Phosphate | 7000 | unsatisfactory | na | na |
| 10 | Mono Butyl Phosphate | 7000 | unsatisfactory | na | yes |

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A polymerizable composition comprising:

(a) one or monomers containing two or more isocyanate groups;

(b) one or more monomers containing two or more functional groups selected from a thiol group and a hydroxyl group;

(c) a mixture of a mono- $C_2$–$C_6$ alfyl phosphate and a di- $C_2$–$C_6$ alkyl phosphate, wherein the akyl groups of the di-alkyl phosphate may be the same or different, and wherein the allyl groups of the mono- and di- $C_2$–$C_6$ alkyl phosphate mixture may be the same or different; and (d) a $C_7$–$C_{18}$ mono- and/or di-alkyl phosphate, wherein the alkyl groups of the $C_7$–$C_{18}$ di-alkyl phosphate may be the same or different, and wherein the alkyl groups $C_7$–$C_{18}$ mono- and di- alkyl phosphate may be the same or different;

wherein the mono $C_2$–$C_6$ alkyl phosphate is present in the mono $C_2$–$C_6$/di $C_2$–$C_6$ alkyl phosphate mixture in an amount of about 45% by weight, and the di $C_2$–$C_6$ alkyl phosphate is present in the mono $C_2$–$C_6$/di $C_2$–$C_6$ alkyl phosphate mixture in an amount of about 55% by weight.

2. A polymerizable composition according to claim 1, further comprising (e) a catalyst.

3. A polymerizable composition according to claim 1, wherein at least one of the two or more functional groups is a thiol group.

4. A polymerizable composition according to claim 1, wherein the mixture of the mono- $C_2$–$C_6$ alkyl phosphate and the di- $C_2$–$C_6$ alkyl phosphate is present in an amount of 1,000 to 15,000 parts per million by weight, and the $C_7$–$C_{18}$ mono- or di-alkyl phosphate is present in an amount of 400 to 1600 parts per million, all based on the total weight of the composition.

5. A polymerizable composition according to claim 1, wherein the mixture of the mono- $C_2$–$C_6$ alkyl phosphate and the di- $C_2$–$C_6$ alkyl phosphate is present in an amount of 1,000 to 4,000 parts per million by weight, and the $C_7$–$C_{18}$ mono- or di-alkyl phosphate is present in an amount of 400 to 800 parts per million, all based on the total weight of the composition.

6. A polymerizable composition according to claim 1, wherein the mixture of the mono- $C_2$–$C_6$ alkyl phosphate and the di- $C_2$–$C_6$ alkyl phosphate is present in an amount of about 2,000 parts per million by weight, and the $C_7$–$C_{18}$ mono- or di-alkyl phosphate is present in an amount of about 600 parts per million, all based on the total weight of the composition.

7. A polymerizable composition according to claim 1, wherein the alkyl groups of both the mono- and di- $C_7$–$C_{18}$ alkyl phosphate are $C_8$–$C_{16}$ alkyl groups, and the alkyl groups of both the mono- and di- $C_2$–$C_6$ alkyl groups are $C_3$–$C_5$ alkyl groups.

8. A polymer produced by a reaction of a composition comprising:

(a) one or monomers containing two or more isocyanate groups;

(b) one or more monomers containing two or more functional groups selected from a thiol group and a hydroxyl group;

(c) a mixture of a mono- $C_2$–$C_6$ alkyl phosphate and a di- $C_{2-C6}$ alkyl phosphate, wherein the alkyl groups of the di-alkyl phosphate may be the same or different, and wherein the alkyl groups of the mono- and di-alkyl phosphate mixture may be the same or different; and (d) a $C_7$–$C_{18}$ mono- and/or di-alkyl phosphate, wherein the alkyl groups of the $C_7$–$C_{18}$ di-alkyl phosphate may be the same or different, and wherein the alkyl groups $C_7$–$C_{18}$ mono- and di-alkyl phosphate may be the same or different; and (e) a catalyst;

wherein the mono $C_2$–$C_6$ alkyl phosphate is present in the mono $C_2$–$C_6$/di $C_2$–$C_6$ alkyl phosphate mixture in an amount of about 45% by weight, and the di $C_2$–$C_6$ alkyl phosphate is present in the mono $C_2$–$C_6$/di $C_2$–$C_6$ alkyl phosphate mixture in an amount of about 55% by weight.

9. A polymer according to claim 8, wherein at least one of the two or more functional groups is a thiol group.

10. A process for producing a polymer, comprising:

(a) providing a composition comprising: (i) one or more monomers containing two or more isocyanate groups, (ii) one or more monomers containing two or more functional groups selected from a thiol group and a hydroxyl group, (iii) a mixture of a mono $C_2$–$C_6$ alkyl phosphate and a di- $C_2$–$C_6$ alkyl phosphate, wherein the alkyl groups of the di-alkyl phosphate may be the same or different, and wherein the alkyl groups of the mono- and di- $C_2$–$C_6$ alkyl phosphate mixture may be the same or different, (iv) a $C_7$–$C_{18}$ mono- and/or di-alkyl phosphate, wherein the alkyl groups of the $C_7$–$C_{18}$ di-alkyl phosphate may be the same or different, and wherein the alkyl groups $C_7$–$C_{18}$ mono- and di-alkyl phosphate may be the same or different, and (v) a catalyst; wherein the mono $C_2$–$C_6$ alkyl phosphate is present in the mono $C_2$–$C_6$/di $C_2$–$C_6$ alkyl phosphate mixture in an amount of about 45% by weight, and the di $C_2$–$C_6$ alkyl phosphate is present in the mono $C_2$–$C_6$/di $C_2$–$C_6$ alkyl phosphate mixture in an amount of about 55% by weight; and (b) subjecting the composition to a polymerization reaction.

11. A polymerizable composition according to claim 1, wherein the mixture of the mono- $C_2$–$C_6$ alkyl phosphate and the di- $C_2$–$C_6$ alkyl phosphate is present in an amount of 1,000 to 7,000 parts per million by weight based on the total weight of the composition.

12. A polymerizable composition according to claim 1, wherein the alkyl group of both the mono- and di-alkyl phosphate is butyl.

* * * * *